United States Patent [19]

Tanaka et al.

[11] Patent Number: 4,639,868
[45] Date of Patent: Jan. 27, 1987

[54] CONTROL METHOD FOR DRILLING APPARATUS WHICH MAKES USE OF A FINAL DRILLING PATTERN TRANSFORMED FROM PRIMARY AND SECONDARY PATTERNS

[75] Inventors: Kazumoto Tanaka, Hiroshima; Tohru Mashimo; Osamu Sato, both of Higashihiroshima; Toyohiko Kobayashi, Hiroshima, all of Japan

[73] Assignee: Mazda Motor Corporation, Hiroshima, Japan

[21] Appl. No.: 713,493

[22] Filed: Mar. 19, 1985

[30] Foreign Application Priority Data

Mar. 24, 1984 [JP] Japan ................................. 59-56797

[51] Int. Cl.$^4$ .......................... G06F 15/20; E21B 7/00
[52] U.S. Cl. ..................... 364/420; 364/422; 173/39; 33/1 H; 33/1 CC; 33/1 M; 33/503; 175/24
[58] Field of Search ............... 364/420, 422; 405/138; 173/39, 42; 33/1 H, 1 CC, 503, 1 M; 175/24

[56] References Cited

U.S. PATENT DOCUMENTS 3,823,787 7/1974 Haworth .............................. 175/24
4,545,017 10/1985 Richardson ........................ 364/422

Primary Examiner—Jerry Smith
Assistant Examiner—Gail O. Hayes
Attorney, Agent, or Firm—Burns, Doane, Swecker & Mathis

[57] ABSTRACT

A drilling method of drilling an imaginary facing for excavating a curved tunnel such that the imaginary facing is nonparallel to an existing facing. The drilling method includes the steps of obtaining a first equation for transformation between a primary coordinate system defined with respect to the imaginary facing and a secondary coordinate system defined with respect to the existing facing, transforming a primary drilling pattern of the primary coordinate system into a secondary drilling pattern of the secondary coordinate system, obtaining a second equation for transformation between the secondary coordinate system and a final coordinate system defined with respect to a drilling vehicle, and transforming the secondary drilling pattern to a final drilling pattern of the final coordinate system.

9 Claims, 8 Drawing Figures

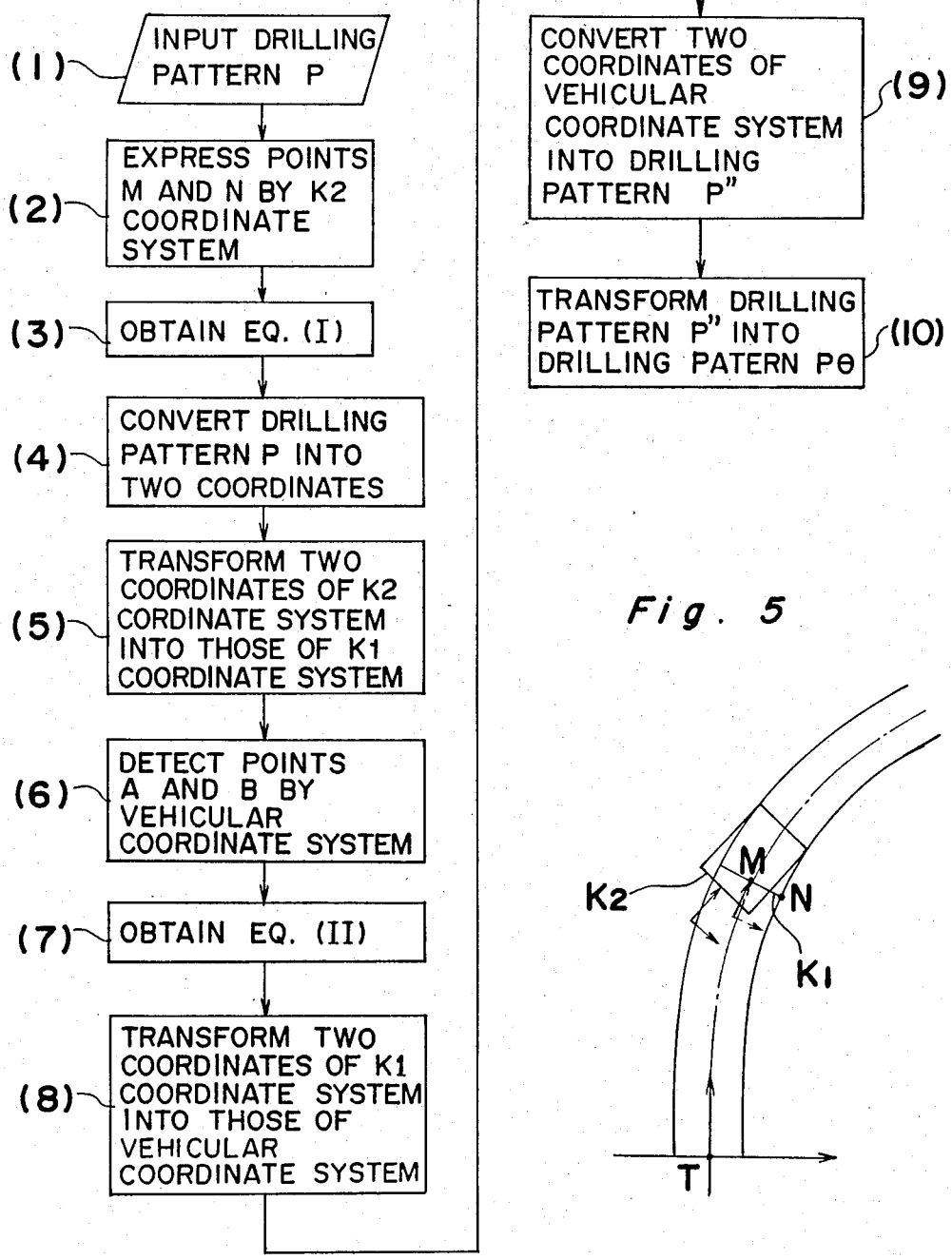

CONTROL METHOD FOR DRILLING APPARATUS WHICH MAKES USE OF A FINAL DRILLING PATTERN TRANSFORMED FROM PRIMARY AND SECONDARY PATTERNS

BACKGROUND OF THE INVENTION

The present invention generally relates to drilling methods for drilling a facing of a tunnel or the like to be excavated, in which a boom mounted with a drilling apparatus is positioned at predetermined drilling positions on the facing in accordance with a drilling pattern of the facing such that the facing is automatically drilled by the drilling apparatus. More particularly, the present invention relates to a drilling method for drilling an imaginary facing for curved excavation in the case of excavation of a curved tunnel, with the imaginary facing being angularly nonparallel to an existing facing.

Conventionally, it has been generally so arranged that when a tunnel or the like is excavated, drilling is performed in a fixed direction at a number of predetermined drilling positions of a facing of the tunnel such that explosives inserted into the drilled holes are blasted. To this end, a boom mounted with a drilling apparatus is required to be positioned at the predetermined drilling positions of the facing.

For positioning of the boom, a playback control method has been conventionally widely employed in which after a positioning operation (teaching operation) of the boom has been preliminarily performed so as to be stored, the teaching operation is played back. However, the known playback control method has such inconveniences that since the teaching operation is based on skill of an operator, its working efficiency is extremely low and its positioning accuracy is not satisfactory.

Thus, in place of the known playback control method, a numerical control method disclosed, for example, in Japanese Patent Publication No. 38752/1982 (Tokkosho No. 57-38752) has been recently employed. In the numerical control method, a drilling pattern expressed in a rectangular coordinate system defined with respect to a facing is transformed into a drilling pattern expressed in a coordinate system defined with respect to a drilling vehicle and then, on the basis of the latter drilling pattern, a boom mounted with a drilling apparatus is positioned at numerically designated predetermined drilling positions of the facing through feedback control such that the facing is automatically drilled. Meanwhile, in the case of excavation of a curved tunnel or the like, an imaginary facing (facing for curved excavation), which is vertically rearwardly retracted over a blasting penetration length from a new facing to be obtained by blasting at an existing facing, is nonparallel to the existing facing so as to form a predetermined angle therebetween. Thus, since the coordinate system defined with respect to the drilling vehicle is deviated from a coordinate system defined with respect to the facing for curved excavation, a deviation between coordinate systems defined with respect to the drilling vehicle and the facing for curved excavation, respectively is required to be modified. However, in the prior art numerical control method, since a deviation between a reference point in a coordinate system defined with respect to the existing facing and a reference point in the coordinate system defined with respect to the facing for curved excavation is measured merely in terms of angular deviations in vertical directions and the angular deviations are employed as a correction value, the deviation of the reference points does not necessarily coincide with the angular deviations when viewed on a plane, thus resulting in unsatisfactory positioning accuracy.

SUMMARY OF THE INVENTION

Accordingly, an essential object of the present invention is to provide an improved drilling method of a numerical control type in which when a facing for curved excavation is drilled, a drilling partern expressed in a coordinate system defined with respect to the facing for curved excavation is transformed, on the basis of relation between a coordinate system defined with respect to an existing facing and the coordinate system defined with respect to the facing for curved excavation, into a drilling pattern expressed in the coordinate system defined with respect to the existing facing and then, the drilling pattern of the coordinate system defined with respect to the existing facing is transformed, on the basis of relation between the coordinate system defined with respect to the existing facing and a coordinate system defined with respect to a drilling vehicle, into a drilling pattern expressed in the coordinate system defined with respect to the drilling vehicle such that the facing for curved excavation is accurately drilled, with substantial elimination of the disadvantages inherent in conventional drilling methods of this kind.

In accomplishing this object according to one preferred embodiment of the present invention, there is provided an improved drilling method of automatically drilling a facing of a tunnel to be excavated, in which a drilling pattern expressed in a rectangular coordinate system defined with respect to said facing is transformed into a final drilling pattern expressed in a final coordinate system defined with respect to a drilling vehicle such that a boom mounted on said drilling vehicle and mounted with a drilling apparatus is positioned, through feedback control thereof, at a predetermined position of said facing on the basis of said final drilling pattern, said drilling method, when an imaginary facing for excavating a curved tunnel is so employed as to be nonparallel to an existing facing and a primary drilling pattern expressed in a primary coordinate system defined with respect to said imaginary facing has been given so as to be transformed into a secondary drilling pattern expressed in a secondary coordinate system defined with respect to said existing facing such that said secondary drilling pattern is further transformed into said final drilling pattern, comprising the pretreatment steps of:

(a) expressing first and second coordinates of first and second points of said secondary coordinate system by using another first and second coordinates of said primary coordinate system, respectively such that a first equation for transformation between said primary and secondary coordinate systems is obtained on the basis of relations between said first coordinates and said another first coordinates and between said second coordinates and said another second coordinates;

(b) converting said primary drilling pattern into third and fourth coordinates of third and fourth points of said primary coordinate system such that said third and fourth coordinates are, respectively, transformed, by using said first equation, into another third and fourth coordinates of said secondary coordinate system, with said another third and fourth coordinates representing said secondary drilling pattern;

(c) detecting fifth and sixth coordinates of a reference point and a fixed point of said secondary coordinate system, in terms of another fifth and sixth coordinates of said final coordinate system, respectively such that a second equation for transformation between said secondary and final coordinate systems is obtained on the basis of relations between said fifth coordinates and said another fifth coordinates and between said sixth coordinates and said another sixth coordinates, with said fixed point being determined on the basis of said reference point; and (d) transforming said another third and fourth coordinates of said secondary coordinate system into further third and fourth coordinates of said final coordinate system, respectively by using said second equation such that said further third and fourth coordinates of said final coordinate system are converted into said final drilling pattern of said final coordinate system.

Consequently, in the numerical control type drilling method of the present invention, since the given primary drilling pattern of the primary coordinate system defined with respect to the imaginary facing for excavating the curved tunnel is transformed, by using the first equation for transformation between the primary and secondary coordinate systems, into the secondary drilling pattern of the secondary coordinate system defined with respect to the existing facing and then, the secondary drilling pattern is transformed, by using the second equation for transformation between the secondary and final coordinate systems, into the final drilling pattern of the final coordinate system defined with respect to the drilling vehicle, a deviation between the primary and final coordinate systems is completely eliminated such that the boom can be accurately positioned at the predetermined drilling positions of the imaginary facing.

Accordingly, in accordance with the present invention, the imaginary facing for excavating the curved tunnel can be accurately drilled, thereby resulting in improvement of excavation accuracy of the curved tunnel or the like.

BRIEF DESCRIPTION OF THE DRAWINGS

These and other objects and features of the present invention will become apparent from the following description taken in conjunction with the preferred embodiments thereof with reference to the accompanying drawings, in which:

FIG. 5 is a schematic view of the curved tunnel of FIG. 4;

FIG. 6 is a flow chart of drilling procedures of the drilling method of FIG. 4;

Before the description of the present invention proceeds, it is to be noted that like parts are designated by like reference numerals throughout several views of the accompanying drawings.

DETAILED DESCRIPTION OF THE INVENTION

Figure 1:
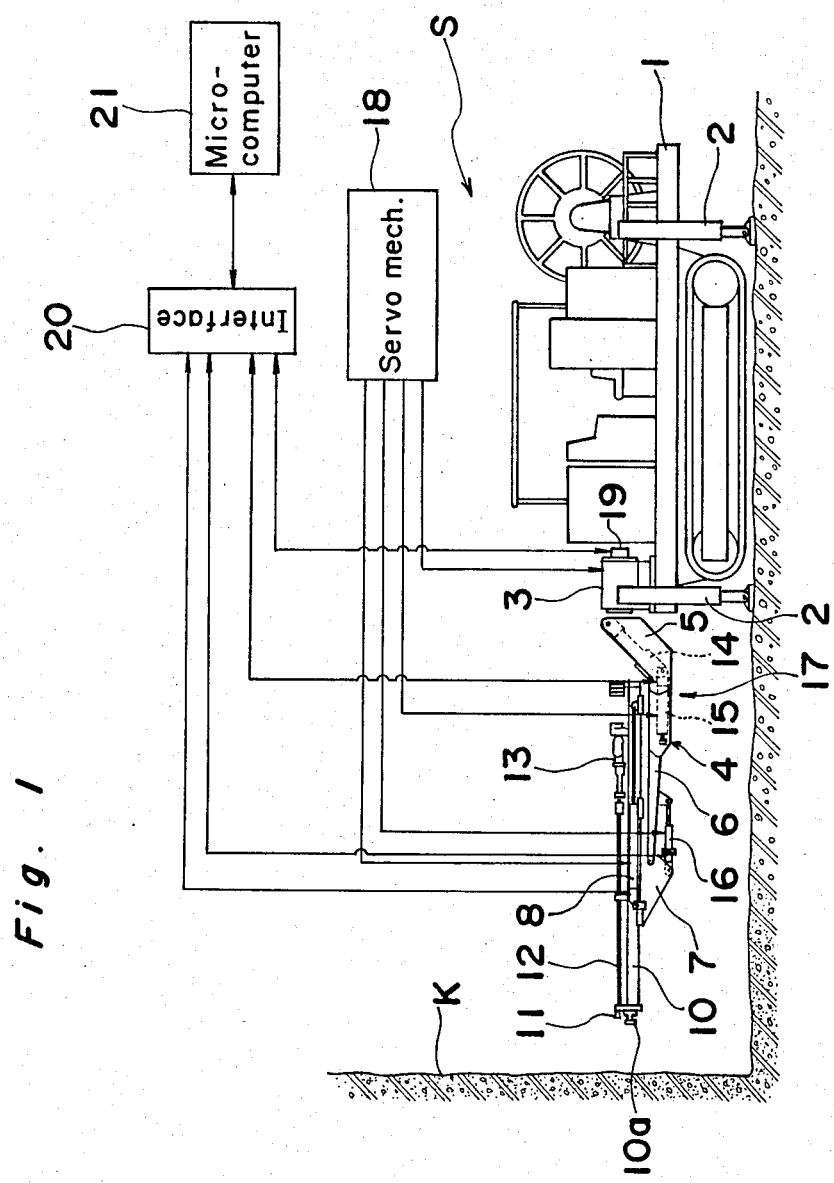
FIG. 1 is a schematic view of a drilling system to which a drilling method of the present invention may be applied.

Referring now to the drawings, there is shown in FIG. 1, a drilling system S to which a numerically controlled drilling method according to a first embodiment of the present invention may be applied. The drilling system S includes a drilling vehicle 1, a rotary actuator 3 mounted on the drilling vehicle 1, a boom 4 constituted by a first boom 5 and a second boom 6, a guide cell 10, a cylinder 8 for sliding the guide cell 10, and a drilling apparatus 13. The drilling vehicle 1 is fixedly supported by support legs 2 standing on the ground so as to confront a facing K. The first boom 5 is rotatably coupled, at its rear end, with the rotary actuator 3. Meanwhile, the second boom 6 is retractably coupled, at its rear end, with a front end of the first boom 5 so as to be moved toward and away from the facing K. Furthermore, the cylinder 8 is secured, through a cell mounting 7, to a front end of the second boom 6. A control device (not shown) for controlling the drilling apparatus 13, which is constituted by a feed motor for controlling operations of the drilling apparatus 13, is mcunted on a rear end portion of the guide cell 10. The guide cell 10 is slidably mounted on the cylinder 8 so as to be moved toward and away from the facing K upon actuation of the cylinder 8. The drilling apparatus 13 is provided with a rod 12 having, at its front end, a bit 11 and is slidably mounted on the guide cell 10 so as to be moved toward and away from the facing K by the above described control device (feed motor) for the drilling device 13 during a drilling operation of the drilling system S.

Figure 2:
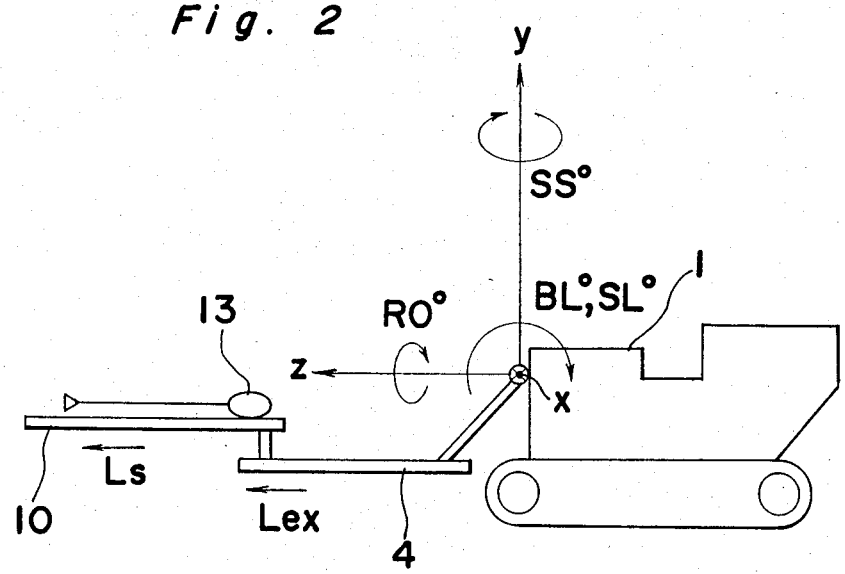
FIG. 2 is a schematic view showing displacement of a boom employed in the drilling system of FIG. 1 and mounted with a drilling apparatus.

Furthermore, a cylinder (not shown) for swinging the guide cell 10, a cylinder 14 for lifting the boom 4, a cylinder 15 for extending the boom 4, and a cylinder 16 for lifting the guide cell 10 are fixed to the boom 4. Accordingly, as shown in FIG. 2, supposing that a three-dimensional rectangular coordinate system having an x-axis a y-axis and a z-axis is defined with respect to the drilling vehicle 1 so as to have an origin set at the time when an extension of the boom 4 and an extension of the guide cell 10 are zero and the boom 4 and the guide cell 10 are parallel to the direction of the z-axis, the boom 4 is so provided as to be displaced relative to the drilling vehicle 1 through a rotation angle RO of the boom 4 in the circumferential direction about the z-axis by the rotary actuator 3, through a lift angle BL of the boom 4 in the circumferential direction about the x-axis by the cylinder 14 and through an extension length Lex of the boom 4 in the direction of the z-axis by the cylinder 15. Meanwhile, the guide cell 10 mounted with the drilling apparatus 13 is so provided as to be displaced relative to the boom 4 through a lift angle SL of the guide cell 10 in the circumferential direction about the x-axis by the cylinder 16, through a swing angle SS of the guide cell 10 in the circumferential direction about the y-axis by the above described cylinder (not shown) for swinging the guide cell 10 and through a slide length Ls of the guide cell 10 in the direction of the z-axis by the cylinder 8. It should be noted that the rectangular coordinate system defined with respect to the drilling vehicle 1 is referred to as a vehicular coordinate system, hereinbelow. Thus, assuming that reference numerals $\theta 1$, $\theta 2$, $\theta 3$ and $\theta 4$ and reference numerals L1 and L2 generally represent angles and lengths, respectively in a spherical coordinate system having an origin set at a rotary coupling point between the rotary actuator 3 and the boom 4, a foremost position of the boom 4, i.e., a foremost position of the guide cell 10 can be expressed by coordinates ($\theta 1$, $\theta 2$, $\theta 3$, $\theta 4$, L1, L2). Accordingly, a boom driving device 17 for arbitrarily displacing in the spherical coordinate system of the coordinates ($\theta 1$, $\theta 2$, $\theta 3$, $\theta 4$, L1, L2) the boom 4 mounted with the drilling apparatus 13 is constituted by the rotary actuator 3, the cylinders 8, 14, 15 and 16 and the cylinder (not shown) for swinging the guide cell 10.

The drilling system S further includes a positioning servo mechanism 18 for controlling the boom driving device 17, an encoder 19 and a microcomputer 21. The servo mechanism 18 is connected to the actuators of the boom driving device 17, i.e., the rotary actuator 3, the cylinders 8, 14, 15 and 16 and the cylinder (not shown) for swinging the guide cell 10, while the encoder 19 detects, through arithmetic operation, actuated amounts of the actuators of the boom driving device 17, i.e., the rotary actuator 3, the cylinders 8, 14, 15 and 16 and the cylinder (not shown) for swinging the guide cell 10. The actuators of the boom driving device 17, i.e., the rotary actuator 3, the cylinders 8, 14, 15 and 16 and the cylinder (not shown) for swinging the guide cell 10, the servo mechanism 18, the encoder 19 and the earlier said control device (feed motor) for controlling the drilling apparatus 13 are connected, via an interface 20, to the microcomputer 21 such that signals are transmitted to each other.

Figure 4:
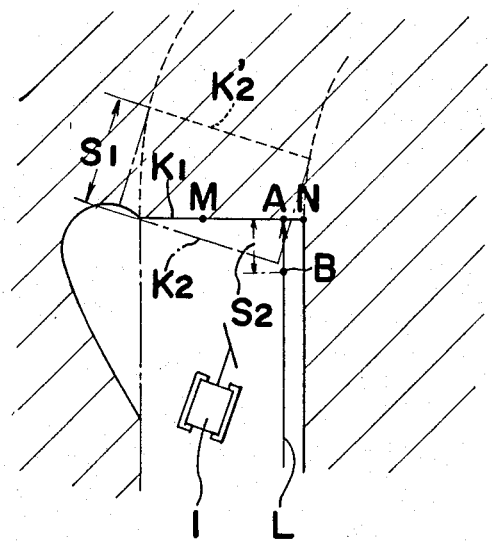
FIG. 4 is a view explanatory of excavation of a curved tunnel by the drilling method according to the first embodiment of the present invention.
Figure 3:
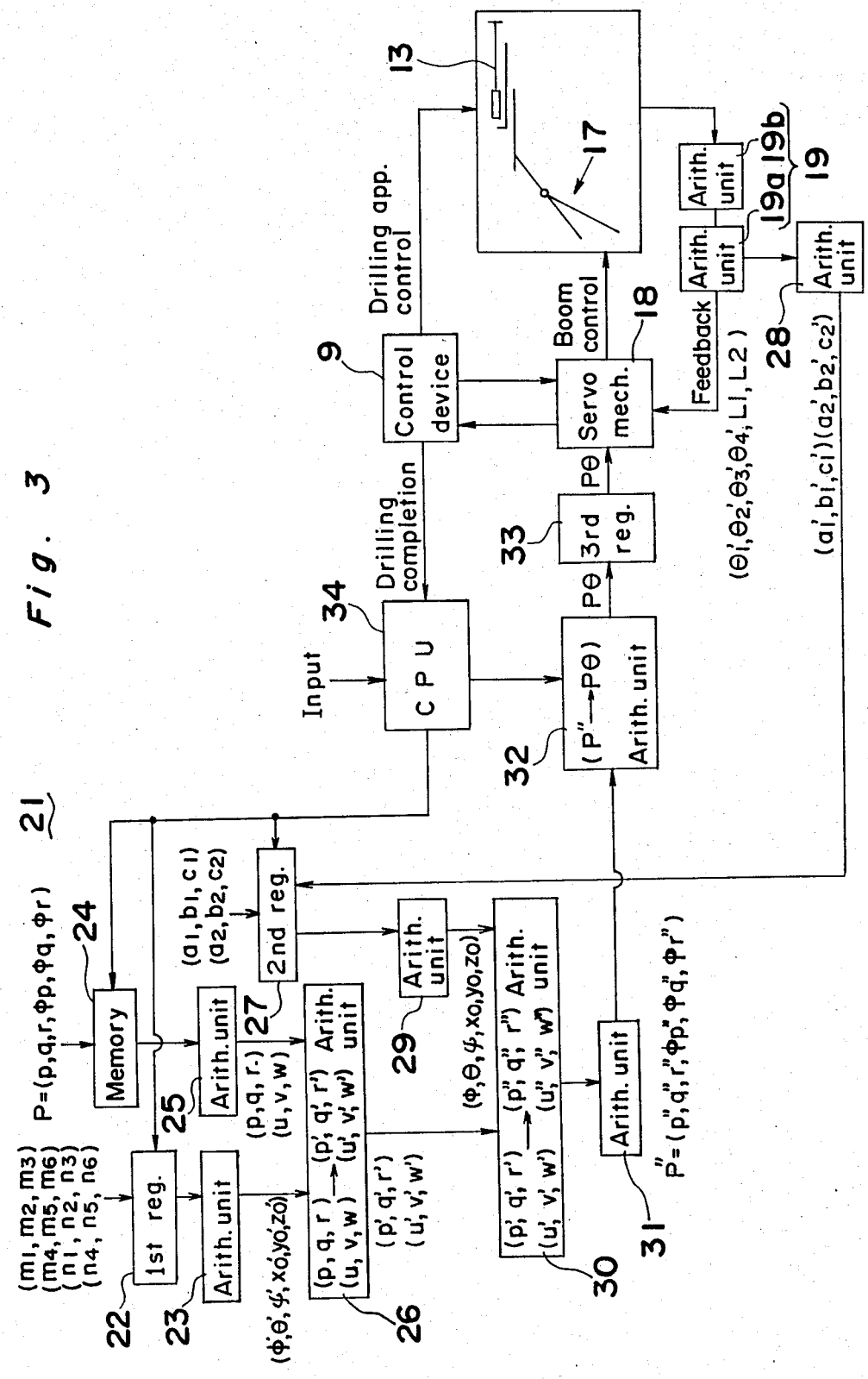
FIG. 3 is a block diagram of an internal configuration of a microcomputer employed in the drilling system of FIG. 1, particularly showing a first embodiment of the present invention.

As shown in FIG. 3, the microcomputer 21 includes a first register 22, arithmetic units 23, 25 and 26 and a memory 24. When a curved tunnel is excavated as shown in FIG. 4, a facing K2 for the curved excavation is set at an imaginary face which is vertically rearwardly retracted over a blasting penetration length S1 from a new facing K2' to be obtained by blasting at an existing facing K1. It is to be noted that rectangular coordinate systems defined with respect to the existing facing K1 and the facing K2 for the curved excavation are, respectively, referred to as K1 and K2 coordinate systems, hereinbelow. In relation to points M and N positioned on the existing facing K1, coordinates (m1, m2, m3) of the point M and coordinates (n1, n2, n3) of the point N expressed in the K1 coordinate system and coordinates (m4, m5, m6) of the point M and coordinates (n4, n5, n6) of the point N expressed in the K2 coordinate system are inputted to the first register 22. In order to transform the coordinates (m1, m2, m3) and (n1, n2, n3) of the K1 coordinate system into the coordinates (m4, m5, m6) and (n4, n5, n6) of the K2 coordinate system, a coordinate system T indicating a configuration of curved lines of the curved tunnel is defined so as to have an origin set at a center of an inlet of the curved tunnel as shown in FIG. 5. Then, coordinates of the points M and N expressed in the coordinate system T are calculated from points of intersection between the curved lines expressed by equations in the coordinate system T and the existing facing K1. Meanwhile, an origin and vectors of three coordinate axes, i.e., an x-axis, a y-axis and a z-axis of the K2 coordinate system are also expressed by values of the coordinate system T in the same manner as described above. Thereafter, perpendiculars are, respectively, extended from the points M and N to the three coordinate axes of the K2 coordinate system so as to obtain points of intersection therebetween. Subsequently, by calculating distances between these points of intersection and the origin of the K2 coordinate system, the coordinates (m4, m5, m6) and (n4, n5, n6) can be obtained. Alternatively, in order to perform the above described transformation between the K1 and K2 coordinate systems, it can be also so arranged that an origin and vectors of three coordinate axes of the K1 coordinate system and those of the K2 coordinate system are expressed in the coordinate system T and then, amounts of shift between the coordinate axes of the K1 coordinate system and those of the K2 coordinate system and angles of intersection therebetween are obtained. On the basis of relations between the coordinates (m1, m2, m3) of the point M in the K1 coordinate system and the coordinates (m4, m5, m6) of the point M in the K2 coordinate system and between the coordinates (n1, n2, n3) of the point N in the K1 coordinate system and the coordinates (n4, n5, n6) of the point N in the K2 coordinate system, the arithmetic unit 23 performs arithmetic operation of equation (I) ($\phi'$, $\theta'$, $\psi'$, x0', y0', z0') for transformation between the K1 and K2 coordinate systems. A position (p, q, r) and a direction ($\phi p$, $\phi q$, $\phi r$) of each of a number of drilling points formed in the K2 coordinate system, namely a drilling pattern P (p, q, r, $\phi p$, $\phi q$, $\phi r$) of each of the drilling points in the K2 coordinate system is inputted to the memory 24 so as to be stored therein, with the direction ($\phi p$, $\phi q$, $\phi r$) being expressed by a unit vector. Meanwhile, the arithmetic unit 25 converts the drilling pattern P (p, q, r, $\phi p$, $\phi q$, $\phi r$) of the memory 24 into two coordinates (p, q, r) and (u, v, w). The arithmetic unit 26 transforms the coordinates (p, q, r) and (u, v, w) of the arithmetic unit 25 into coordinates (p', q', r') and (u', v', w') of the K1 coordinate system, respectively by using the equation (I) ($\phi'$, $\theta'$, $\psi'$, x0', y0', z0') obtained by the arithmetic unit 23.

Furthermore, the drilling system S includes a second register 27 and arithmetic units 28, 29, 30 and 31. As shown in FIG. 4, a laser beam L is vertically applied to a point A of the existing facing K1 such that the point A acts as a reference point of the existing facing K1. Then, a point, which is rearwardly retracted over a predetermined length S2 along the laser beam L from the point A, is defined as a point B. In the K1 coordinate system, the points A and B are expressed by coordinates (a1, b1, c1) and (a2, b2, c2), respectively. The coordinates (a1, b1, c1) and (a2, b2, c2) of the K1 coordinate system are detected through manual operation of the boom 4 by a first arithmetic unit 19a of the encoder 19 and then, are, respectively, transformed by the arithmetic unit 28 into coordinates (a1', b1', c1') and (a2', b2', c2') expressed in the vehicular coordinate system. The coordinates (a1, b1, c1) of the point A and the coordinates (a2, b2, c2) of the point B expressed in the K1 coordinate system, and the coordinates (a1', b1', c1') of the point A and the coordinates (a2', b2', c2') of the point B expressed in the vehicular coordinate system are inputted to the second register 27. On the basis of relations between the coordinates (a1, b1, c1) of the point A in the K1 coordinate system and the coordinates (a1', b1', c1') of the point A in the vehicular coordinate system and between the coordinates (a2, b2, c2) of the point B in the K1 coordinate system and the coordinates (a2', b2', c2') of the point B in the vehicular coordinate system, the arithmetic unit 29 performs arithmetic operation of an equation (II) ($\phi$, $\theta$, $\psi$, x0, y0, z0) for transformation between the K1 coordinate system and the vehicular coordinate system. Meanwhile, the arithmetic unit 30 transforms the two coordinates (p', q', r') and (u', v', w') of the arithmetic unit 26 into coordinates (p'', q'', r'') and (u'', v'', w'') of the vehicular coordinate system, respectively by using the equation (II) ($\phi$, $\theta$, $\psi$, x0, y0, z0) obtained at the arithmetic unit 29. The arithmetic unit 31 converts the two coordinates (p'', q'', r'') and (u'', v'', w'') of the arithmetic unit 30 into a drilling pattern P'' (p'', q'', r'', $\phi$p'', $\phi$q'', $\phi$r'') expressed in the vehicular coordinate system.

Moreover, the drilling system S includes an arithmetic unit 32, a third register 33 and a central processing unit (CPU) 34. In FIG. 3, it should be noted that reference numeral 9 represents the earlier said control device (feed motor) for controlling the drilling apparatus 13, which is not shown in FIGS. 1 and 2. By using an asymptotic calculating technique, the arithmetic unit 32 transforms the drilling pattern P'' (p'', q'', r'', $\phi$p'', $\phi$q'', $\phi$r'') of the arithmetic unit 31 into a drilling pattern P$\theta$ ($\theta$1, $\theta$2, $\theta$3, $\theta$4, L1, L2) expressed in the spherical coordinate system defined with respect to the boom 4, (hereinbelow, referred to as a "boom coordinate system"). The drilling pattern P$\theta$ ($\theta$1, $\theta$2, $\theta$3, $\theta$4, L1, L2) of the boom coordinate system, which is obtained in the arithmetic unit 32, not only is stored in the third register 33 but also is delivered to the servo mechanism 18. On the basis of the drilling pattern P$\theta$ ($\theta$1, $\theta$2, $\theta$3, $\theta$4, L1, L2) of the boom coordinate system, the positioning servo mechanism 18 controls operations of the boom driving device 17 and an actuated amount ($\theta$1', $\theta$2', $\theta$3', $\theta$4', L1', L2') of the boom driving device 17 is detected by a second arithmetic unit 19b of the encoder 19. Then, since the actuated amount ($\theta$1', $\theta$2', $\theta$3', $\theta$4', L1', L2') detected by the second arithmetic unit 19b is fed back to the servo mechanism 18, a front end of the boom 4, i.e., a front end of the guide cell 10 is subjected to feedback control so as to be set at positions and directions corresponding to the drilling pattern P$\theta$ ($\theta$1, $\theta$2, $\theta$3, $\theta$4, L1, L2) of the boom coordinate system. At the same time, the control device (feed motor) 9 is controlled in response to a positioning completion signal from the positioning servo mechanism 18 and thus, drilling is performed at predetermined drilling points by the drilling apparatus 13. Meanwhile, in response to an operational input signal and an operation completion signal from the control device 9, the CPU 34 outputs command signals to the memory 24 and the first and second registers 22 and 27 so as to actuate the memory 24 and the first and second registers 22 and 27.

Hereinbelow, steps (1) to (10) of the drilling method of the present invention for excavating the curved tunnel by using the drilling system S will be described with reference to a flow chart of FIG. 6.

(1) Initially, the drilling pattern P (p, q, r, $\phi$p, $\phi$q, $\phi$r) of the K2 coordinate system is given and is inputted to the memory 24.

(2) With respect to the points M and N disposed on the existing facing K1, the coordinates (m4, m5, m6) of the point M and the coordinates (n4, n5, n6) of the point N expressed in the K2 coordinate system are obtained in addition to the coordinates (m1, m2, m3) of the point M and the coordinates (n1, n2, n3) of the point N expressed in the K1 coordinate system. The coordinates (m1, m2, m3) and (m4, m5, m6) of the point M and the coordinates (n1, n2, n3) and (n4, n5, n6) of the point N are inputted to the first register 22.

(3) Subsequently, on the basis of relations between the coordinates of the points M and N (above step (2)) expressed in the K1 coordinate system and those expressed in the K2 coordinate system, i.e., relations between the coordinates (m1, m2, m3) of the point M in the K1 coordinate system and the coordinates (m4, m5, m6) of the point M in the K2 coordinate system and between the coordinates (n1, n2, n3) of the point N in the K1 coordinate system and the coordinates (n4, n5, n6) of the point N in the K2 coordinate system, the equation (I) for transformation between the K1 and K2 coordinate systems is obtained.

In order to perform arithmetic operation of the equation (I) for transformation between the K1 and K2 coordinate system's, relations between the K1 and K2 coordinate systems with respect to the points M and N are given by the following simultaneous equations:

$$\begin{pmatrix} m1 \\ m2 \\ m3 \end{pmatrix} = (\phi', \theta', \psi') \begin{pmatrix} m4 \\ m5 \\ m6 \end{pmatrix} + \begin{pmatrix} x0' \\ y0' \\ z0' \end{pmatrix}$$

$$\begin{pmatrix} n1 \\ n2 \\ n3 \end{pmatrix} = (\phi', \theta', \psi') \begin{pmatrix} n4 \\ n5 \\ n6 \end{pmatrix} + \begin{pmatrix} x0' \\ y0' \\ z0' \end{pmatrix}$$

where ($\phi'$, $\theta'$, $\psi'$) is a coordinate transformation matrix indicative of angles of rotation between the K1 and K2 coordinate systems and $$\begin{pmatrix} x0' \\ y0' \\ z0' \end{pmatrix}$$

is a vector indicative of parallel shifts between the K1 and K2 coordinate systems.

The above simultaneous equations are solved by employing an asymptotic calculating method so as to obtain values of $\phi'$, $\theta'$, $\psi'$, x0', y0' and z0'. Namely, the equation (I) for transformation between the K1 and K2 coordinate systems is represented by the matrix ($\phi'$, $\theta'$, $\psi'$) and the vector $$\begin{pmatrix} x0' \\ y0' \\ z0' \end{pmatrix}.$$

(4) The drilling pattern P (p, q, r, $\phi$p, $\phi$q, $\phi$r) of the K2 coordinate system, which was obtained at the above step (1), is converted into the two coordinates (p, q, r) and (u, v, w) by the arithmetic unit 25.

(5) Thereafter, by using the equation (I) obtained at the above step (3), the drilling pattern of the K2 coordinate system, which is expressed by the two coordinates (p, q, r) and (u, v, w) at the above step (4), is converted into the coordinates (p', q', r') and (u', v', w') of the K1 coordinate system, respectively by the arithmetic unit 26 as follows.

$$\begin{pmatrix} p' \\ q' \\ r' \end{pmatrix} = (\phi', \theta', \psi') \begin{pmatrix} p \\ q \\ r \end{pmatrix} + \begin{pmatrix} x0' \\ y0' \\ z0' \end{pmatrix}$$

$$\begin{pmatrix} u' \\ v' \\ w' \end{pmatrix} = (\phi', \theta', \psi') \begin{pmatrix} u \\ v \\ w \end{pmatrix} + \begin{pmatrix} x0' \\ y0' \\ z0' \end{pmatrix}$$

(6) Meanwhile, the boom 4 is manually operated at the drilling site such that a target 10a attached to the front end of the guide cell 10 is subjected to the laser beam L. Thus, by employing the point A disposed on the existing iacing K1 and the point B which is rearwardly retracted over the predetermined length S2 along the laser beam L from the point A, the coordinates (a1, b1, c1) of the point A and the coordinates (a2, b2, c2) of the point B expressed in the K1 coordinate system are detected by the first arithmetic unit 19a of the encoder 19 and then, are transformed by the arithmetic unit 28 into the coordinates (a1', b1', c1') of the point A and the coordinates (a2', b2', c2') of the point B expressed in the vehicular coordinate system such that the coordinates (a1', b1', c1') and (a2', b2', c2') of the vehicular coordinate system are inputted to the second register 27.

(7) Subsequently, on the basis of relations between the K1 coordinate system and the vehicular coordinate system with respect to the points A and B of the above step (6), i.e., relations between the coordinates (a1, b1, c1) of the point A in the K1 coordinate system and the coordinates (a1', b1', c1') of the point A in the vehicular coordinate system and between the coordinates (a2, b2, c2) of the point B in the K1 coordinate system and the coordinates (a2', b2', c2') of the point B in the vehicular coordinate system, the equation (II) for transformation between the K1 coordinate system and the vehicular coordinate system is obtained.

In order to perform arithmetic operation of the equation (II) for transformation between the K1 coordinate system and the vehicular coordinate system, relations between the K1 coordinate system and the vehicular coordinate system with respect to the points A and B are given by the following simultaneous equations:

$$\begin{pmatrix} a1' \\ b1' \\ c1' \end{pmatrix} = (\phi, \theta, \psi) \begin{pmatrix} a1 \\ b1 \\ c1 \end{pmatrix} + \begin{pmatrix} x0 \\ y0 \\ z0 \end{pmatrix}$$

$$\begin{pmatrix} a2' \\ b2' \\ c2' \end{pmatrix} = (\phi, \theta, \psi) \begin{pmatrix} a2 \\ b2 \\ c2 \end{pmatrix} + \begin{pmatrix} x0 \\ y0 \\ z0 \end{pmatrix}$$

where $(\phi, \theta, \psi)$ is a coordinate transformation matrix indicative of angles of rotation between the K1 and vehicular coordinate systems and $$\begin{pmatrix} x0 \\ y0 \\ z0 \end{pmatrix}$$

is a vector indicative of parallel shifts between the K1 vehicular coordinate systems.

The above simultaneous equations are solved by an asymptotic calculating method so as to obtain values of $\phi$, $\theta$, $\psi$, x0, y0 and z0. Namely the equation (II) for transformation between the K1 coordinate system and the vehicular coordinate system is represented by the matrix $(\phi, \theta, \psi)$ and the vector $$\begin{pmatrix} x0 \\ y0 \\ z0 \end{pmatrix}.$$

(8) Thereafter, by using the equation (II) obtained at the above step (7), the drilling pattern of the K1 coordinate system, which is expressed by the two coordinates (p', q', r') and (u', v', w') of the K1 coordinate system at the above step (5) is converted inro the coordinates (p'', q'', r'') and (u'', v'', w'') of the vehicular coordinate system, respectively by the arithmetic unit 30 as follows.

$$\begin{pmatrix} p'' \\ q'' \\ r'' \end{pmatrix} = (\phi, \theta, \psi) \begin{pmatrix} p' \\ q' \\ r' \end{pmatrix} + \begin{pmatrix} x0 \\ y0 \\ z0 \end{pmatrix}$$

$$\begin{pmatrix} u'' \\ v'' \\ w'' \end{pmatrix} = (\phi, \theta, \psi) \begin{pmatrix} u' \\ v' \\ w' \end{pmatrix} + \begin{pmatrix} x0 \\ y0 \\ z0 \end{pmatrix}$$

(9) Furthermore, the drilling pattern of the vehicular coordinate system, which is expressed by the two coordinates (p'', q'', r'') and (u'', v'', w'') of the vehicular coordinate system at the above step (8), is converted into the drilling pattern P'' (p'', q'', r'', $\phi p''$, $\phi q''$, $\phi r''$) of the vehicular coordinate system by the arithmetic unit 31.

(10) Subsequently, the drilling pattern P'' (p'', q'', r'', $\phi p''$, $\phi q''$, $\phi r''$) expressed in the vehicular coordinate system at the above step (9) is transformed into the drilling pattern P$\theta$ ($\theta 1$, $\theta 2$, $\theta 3$, $\theta 4$, L1, L2) of the boom coordinate system by the arithmetic unit 32. Consequently, on the basis of the drilling pattern P$\theta$ of the boom coordinate system, the front end of the boom 4, i.e., the front end of the guide cell 10 is positioned at a predetermined position of the facing K2 through feedback control such that an automatic drilling operation is performed.

As is clear from the foregoing description, in the drilling method of the present invention, when the drilling pattern of the K2 coordinate system for excavating the curved tunnel has been given, the drilling pattern of the K2 coordinate system is transformed into that of the K1 coordinate system by using the equation (I) for transformation between the K1 and K2 coordinate systems. The drilling pattern of the K1 coordinate system is further transformed into that of the vehicular coordinate system by using the equation (II) for transformation between the K1 coordinate system and the vehicular coordinate system. Subsequently, on the basis of the drilling pattern of the vehicular coordinate system, the boom 4 is positioned on the facing K2 for the curved excavation such that the automatic drilling operation is performed.

Accordingly, in according with the present invention, since a deviation between the K2 coordinate system and the vehicular coordinate system is completely eliminated, it becomes possible to accurately drill on the facing K2 for the curved excavation, thereby resulting in rise of excavation accuracy for the curved tunnel, etc.

Figure 7:
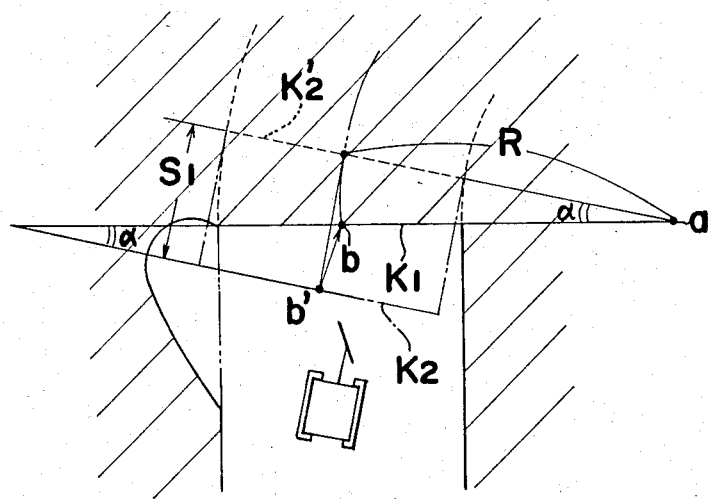
FIG. 7 is a view similar to FIG. 4, particularly showing a second embodiment of the present invention.
Figure 8:
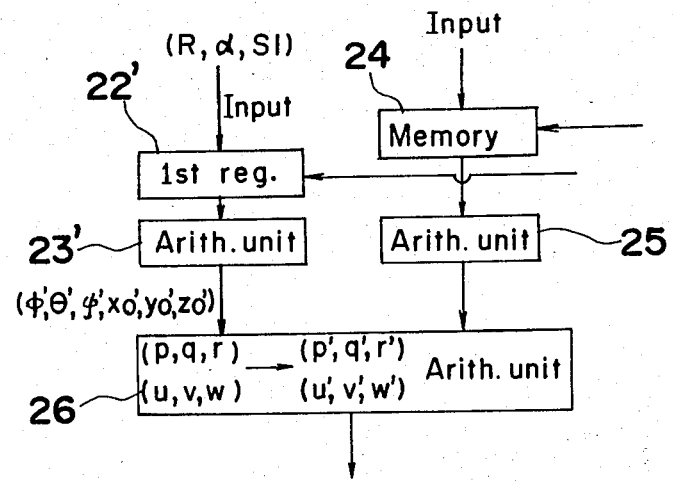
FIG. 8 is a fragmentary block diagram similar to FIG. 3, particularly showing the second embodiment of the present invention.

Meanwhile, in order to obtain the equation (I) for transformation between the K1 and K2 coordinate systems, it is so arranged in this embodiment that the two points M and N disposed on the existing facing K1 are expressed by the coordinates of the K1 and K2 coordinate systems and then, arithmetic operation of said coordinates of the K1 and K2 coordinate systems is performed by using an asymptotic calculating method. However, it can be also so arranged as shown in FIG. 7 showing a second embodiment of the present invention. Namely, as shown in FIG. 7, the new facing K2' to be obtained by blasting at the existing facing K1 is so set as to extend through a center a of curvature of the curved tunnel. Thus, an angle $\alpha$ formed between the facing K2' and the existing facing K1 denotes a rotation angle between the new facing K2' and the existing facing K1. From this angle $\alpha$, the values of the angles $\phi'$, $\theta'$ and $\psi'$ indicative of amount of rotation between the K1 and K2 coordinate systems can be determined. Meanwhile, the facing K2 for the curved excavation is vertically displaced over the predetermined length (blasting penetration length) S1 from the facing K2' as shown in FIG. 4. Furthermore, the x0', y0' and z0' indicative of the parallel shifts between the facing K2 and the new facing K2', i.e., between the K1 and K2 coordinate systems are x-, y- and z-components of a three-dimensional vector connecting a fixed point b on the existing facing K1 and a fixed point b' on the facing K2. Since these components can be expressed by curve data (R, $\alpha$, S1) composed of a radius R of curvature of the curved tunnel, the angle $\alpha$ formed between the existing facing K1 and the new facing K2' and the blasting penetration length S1, it becomes possible to obtain from the curve data (R, o, S1) the equation (I) ($\phi'$, $\theta'$, $\psi'$, x0', y0', z0') for transformation between the K1 and K2 coordinate systems. In order to obtain the equation (I) ($\phi'$, $\theta'$, $\psi'$, x0', y0', Z0'), the curve data (R, $\alpha$, S1) is inputted to a first register 22' and then, the equation (I) ($\phi'$, $\theta'$, $\psi'$, x0', y0', z0') can be obtained from an arithmetic unit 23' as shown in FIG. 8. Namely, in the second embodiment of the present invention, by dividing the angle $\alpha$ into rotation angles about the x-axis, y-axis and z-axis, the values of the angles $\phi'$, $\theta'$, $\psi'$) can be obtained. Furthermore, by dividing the radius R of curvature and the blasting penetration length S1 into the shifts in the directions of the x-axis, y-axis and z-axis, the values of the shifts (x0', y0', z0') can be obtained. Since the subsequent steps of the drilling method according to the second embodiment of the present invention are the same as those of the drilling method according to the first embodiment of the present invention, description thereof is abbreviated for the sake of brevity.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A drilling method of automatically drilling a facing of a tunnel to be excavated, in which a drilling pattern expressed in a rectangular coordinate system defined with respect to said facing is transformed into a final drilling pattern expressed in a final coordinate system defined with respect to a drilling vehicle such that a boom mounted on said drilling vehicle and mounted with a drilling apparatus is positioned, through feedback control thereof, at a predetermined position of said facing on the basis of said final drilling pattern, said drilling method, when an imaginary facing for excavating a curved tunnel is so employed as to be nonparallel to an existing facing and a primary drilling pattern expressed in a primary coordinate system defined with respect to said imaginary facing has been given so as to be transformed into a secondary drilling pattern expressed rn a secondary coordinate system defined with respect to said existing facing such that said secondary drilling pattern is further transformed into said final drilling pattern, comprising the pretreatment steps of:
   (a) expressing first and second coordinates of first and second points of said secondary coordinate system by using another first and second coordinates of said primary coordinate system, respectively such that a first equation for transformation between said primary and secondary coordinate systems is obtained on the basis of relations between said first coordinates and said another first coordinates and between said second coordinates and said another second coordinates;
   (b) converting said primary drilling pattern into third and fourth coordinates of third and fourth points of said primary coordinate system such that said third and fourth coordinates are, respectively, transformed, by using said first equation, into another third and fourth coordinates of said secondary coordinate system, with said another third and fourth coordinates representing said secondary drilling pattern;
   (c) detecting fifth and sixth coordinates of a reference point and a fixed point of said secondary coordinate system, in terms of another fifth and sixth coordinates of said final coordinate system, respectively such that a second equation for transformation between said secondary and final coordinate systems is obtained on the basis of relations between said fifth coordinates and said another fifth coordinates and between said sixth coordinates and said another sixth coordinates, with said fixed point being determined on the basis of said reference point; and
   (d) transforming said another third and fourth coordinates of said secondary coordinate system into further third and fourth coordinates of said final coordinate system, respectively by using said second equation such that said further third and fourth coordinates of said final coordinate system are converted into said final drilling pattern of said final coordinate system.

2. A drilling method as claimed in claim 1, wherein said primary drilling partern is constituted by said third coordinates indicative of a position of said third point acting as a drilling point and a unit vector indicative of a direction of said third point such that said fourth point is displaced over said unit vector from said third point.

3. A drilling method as claimed in claim 2, wherein said reference point is disposed on said existing facing and a laser beam is vertically applied, at said reference point, to said existing facing such that said fixed point is rearwardly retracted over a predetermined length along a path of said laser beam from said reference point.

4. A drilling method as claimed in claim 1, wherein said reference point is disposed on said existing facing and a laser beam is vertically applied, at said reference point, to said existing facing such that said fixed point is rearwardly retracted over a predetermined length along a path of said laser beam from said reference point.

5. A drilling method as claimed in claim 1, wherein said first and second points are disposed on said existing facing.

6. A drilling method of automatically drilling a facing of a tunnel to be excavated, in which a drilling pattern expressed in a rectangular coordinate system defined with respect to said facing is transformed into a final drilling pattern expressed in a final coordinate system defined with respect to a drilling vehicle such that a boom mounted on said drilling vehicle and mounted with a drilling apparatus is positioned, through feedback control thereof, at a predetermined position of said facing on the basis of said final drilling pattern, said drilling method, when an imaginary facing for excavating a curved tunnel is so employed as to be nonparallel to an existing facing and a primary drilling pattern expressed in a primary coordinate system defined with respect to said imaginary facing has been given so as to be transformed into a secondary drilling pattern expressed in a secondary coordinate system defined with respect to said existing facing such that said secondary drilling pattern is further transformed into said final drilling pattern, comprising the pretreatment steps of:

(a) obtaining, on the basis of curve data composed of a radius of curvature of said curved tunnel, an angle formed between said existing facing and a new facing to be obtained by blasting at said existing facing, and a blasting penetration length, a first equation for transformation between said primary and secondary coordinate systems;

(b) converting said primary drilling pattern into third and fourth coordinates of third and fourth points of said primary coordinate system such that said third and fourth coordinates are, respectively, transformed, by using said first equation, into another third and fourth coordinates of said secondary coordinate system, with said another third and fourth coordinates representing said secondary drilling pattern;

(c) detecting fifth and sixth coordinates of a reference point and a fixed point of said secondary coordinate system, in terms of another fifth and sixth coordinates of said final coordinate system, respectively such that a second equation for transformation between said secondary and final coordinate systems is obtained on the basis of relations between said fifth coordinates and said another fifth coordinates and between said sixth coordinates and said another sixth coordinates, with said fixed point being determined on the basis of said reference point; and (d) transforming said another third and fourth coordinates of said secondary coordinate system into further third and fourth coordinates of said final coordinate system, respectively by using said second equation such that said further third and fourth coordinates of said final coordinate system are converted into said final drilling pattern of said final coordinate system.

7. A drilling method as claimed in claim 6, wherein said primary drilling pattern is constituted by said third coordinates indicative of a position of said third point acting as a drilling point and a unit vector indicative of a direction of said third point such that said fourth point is displaced over said unit vector from said third point.

8. A drilling method as claimed in claim 7, wherein said reference point is disposed on said existing facing and a laser beam is vertically applied, at said reference point, to said existing facing such that said fixed point is rearwardly retracted over a predetermined length along a path of said laser beam from said reference point.

9. A drilling method as claimed in claim 6, wherein said reference point is disposed on said existing facing and a laser beam is vertically applied, at said reference point, to said existing facing such that said fixed point is rearwardly retracted over a predetermined length along a path of said laser beam from said reference point.

* * * * *